United States Patent
Joo et al.

(10) Patent No.: US 9,298,182 B2
(45) Date of Patent: Mar. 29, 2016

(54) METHOD OF DISPLAYING ABNORMAL STATUS IN PLANT OPERATION MONITORING SYSTEM

(71) Applicant: Xeonet Co., Ltd, Seongnam-si, Gyeonggi-do (KR)

(72) Inventors: Seong-Chul Joo, Yongin-si (KR); Young-Min Kweon, Seoul (KR)

(73) Assignee: XEONET CO., LTD, Gyeonggi-Do (KR)

(*) Notice: Subject to any disclaimer, the term of this patent is extended or adjusted under 35 U.S.C. 154(b) by 705 days.

(21) Appl. No.: 13/714,425

(22) Filed: Dec. 14, 2012

(65) Prior Publication Data
US 2013/0158682 A1   Jun. 20, 2013

(30) Foreign Application Priority Data
Dec. 15, 2011   (KR) .................... 10-2011-0135483

(51) Int. Cl.
*G05B 23/02*   (2006.01)
*G05B 19/4063*   (2006.01)

(52) U.S. Cl.
CPC ........ *G05B 23/0272* (2013.01); *G05B 19/4063* (2013.01); *G05B 2219/34475* (2013.01)

(58) Field of Classification Search
CPC ........... G05B 23/0272; G05B 19/4063; G05B 2219/34475
See application file for complete search history.

(56) References Cited

U.S. PATENT DOCUMENTS

| | | | | |
|---|---|---|---|---|
| 4,570,217 A * | 2/1986 | Allen | ........................ | G06F 1/14 700/83 |
| 5,247,433 A * | 9/1993 | Kitaura | .................... | G06F 3/011 376/216 |
| 5,548,597 A * | 8/1996 | Kayama | .................... | G07C 3/00 714/30 |
| 5,581,242 A * | 12/1996 | Arita | .................. | G05B 23/0272 340/404.1 |
| 5,590,036 A * | 12/1996 | Maeda | ..................... | G05B 9/02 700/79 |
| 5,617,311 A * | 4/1997 | Easter | ..................... | G05B 9/02 340/525 |
| 5,828,714 A * | 10/1998 | De Venne | ............... | G21C 15/18 376/282 |
| 5,914,875 A * | 6/1999 | Monta | ................ | G05B 23/0281 376/245 |
| 6,061,640 A * | 5/2000 | Tanaka | ............. | G05B 19/41875 700/108 |
| 6,288,650 B2 * | 9/2001 | Chavand | ....................... | 340/525 |
| 6,421,571 B1 * | 7/2002 | Spriggs | .................. | G05B 15/02 345/629 |
| 2001/0013832 A1* | 8/2001 | Chavand | .................. | F17C 13/02 340/679 |
| 2003/0023518 A1* | 1/2003 | Spriggs | .................. | G05B 15/02 705/28 |
| 2004/0133289 A1* | 7/2004 | Larsson | .................... | G05B 9/02 700/83 |
| 2011/0184547 A1* | 7/2011 | Loutfi | ....................... | F27B 7/42 700/110 |
| 2012/0048396 A1* | 3/2012 | Takemoto | ............. | F15B 19/005 137/487.5 |
| 2012/0310597 A1* | 12/2012 | Uchiyama | .......... | G05B 23/0278 702/185 |

FOREIGN PATENT DOCUMENTS

| | | |
|---|---|---|
| JP | 2000214924 A | 8/2000 |
| KR | 1019990063370 | 7/1999 |

* cited by examiner

*Primary Examiner* — Ramesh Patel
(74) *Attorney, Agent, or Firm* — Revolution IP, PLLC

(57) ABSTRACT

The disclosure pertains to a method of displaying an abnormal status in a plant operation monitoring system. The method of displaying the abnormal status includes the steps of: receiving information of operational states from a sensor mounted on devices, machines and facilities constituting an industrial plant system; checking any abnormal signal in the operational states, logically grouping parts influencing on operational values when the abnormal signal is generated, and displaying the parts on a piping & instrument drawing (P&ID) on a monitor; and tracing the abnormal signal in a reverse direction of a system flow, searching out the device which causes the abnormal state, and displaying the abnormal device on the piping & instrument drawing.

3 Claims, 10 Drawing Sheets

FIG. 5

| | | System parts and pipeline | | | | | | | | | | | | | |
|---|---|---|---|---|---|---|---|---|---|---|---|---|---|---|---|
| | | heat exchanger | pipeline 1 | temperature control valve | pipeline 2 | flow rate control valve | pipeline 3 | filter | pipeline 4 | generator wire | pipeline 5 | cooling water reservoir | pipeline 6 | cooling water pump | pipeline 7 | pipeline 8 | pipeline 9 |
| temperature | cause of change | ∨ | | ∨ | | | | | | ∨ | | | | | | | |
| | isothermal zone | | ▬ | | ▬ | | | | ▬ | | | | | | ▬ | ▬ | ▬ |
| | temperature sensor | | T1 | | | | T2 | | | | | T3 | | | | T4 | T5 |
| pressure | cause of change | ∨ | | | | ∨ | | ∨ | | ∨ | | | | ∨ | | | |
| | isobaric zone | | | | ▬ | | P1 | | P2 | ▬ | P3 | | P4 | | | | |
| | pressure sensor | | | | | | | | | | | | | | P5 | P6 | P7 |

METHOD OF DISPLAYING ABNORMAL STATUS IN PLANT OPERATION MONITORING SYSTEM

CROSS-REFERENCE TO RELATED APPLICATIONS

This application claims priority to Korean Patent Application No. 10-2011-0135483 filed on Dec. 15, 2011, the disclosure of which is incorporated herein by reference in its entirety.

BACKGROUND OF THE INVENTION

1. Field of the Invention

The present invention relates to a method of searching out a device which causes a failure and analyzing and displaying ripple effects caused by results of the failure in an industrial plant system, and more particularly, to a method of searching out a device which causes a failure and analyzing and displaying ripple effects caused by results of the failure in an industrial plant system, which can analyze a signal of a detection sensor mounted in the industrial plant system, search out a device which causes the failure, analyze ripple effects caused by results of the failure, and display the analyzed results on a piping and instrument drawing (P&ID) to thereby rapidly and exactly grasp an operational state and a failure state and control the progress and expansion of the failure.

2. Background Art

An industrial plant includes various process systems, such as water supply systems, air systems, vaporization systems, lubricating oil systems, and the systems are closely associated with one another, and hence, if one of the systems is in failure, the failure is transferred to the other systems and it causes a change in process. Accordingly, if proper corrective measures are not taken, the failure status is amplified and causes a serious failure.

In order to effectively monitor and control an operational state, measuring instruments, such as thermometers, pressure gauges, and so on, are mounted on the plant system and facility, and managers check process operation values and judge whether or not there is any failure while making an inspection, but it is difficult to effectively manage them due to limits of time and space.

With development of measuring and controlling technologies, the measuring instruments have been substituted with measuring sensors and the monitoring method has been also changed from surveillance by manpower into remote surveillance by a computer to thereby remarkably reduce a period of time for grasping the situations, but in fact, it is difficult to check changes in the process systems of the large-scale plant in which ten thousands of measuring instruments are mounted, to find whether or not there is any failure, to comprehensively analyze the changes, and to expiscate which machine provides the cause of the failure.

Managers who have such large-scale plants put in a great deal of effort to enhance analyzing power by installing cutting-edge automated monitoring devices and controlling devices, but finding of minute symptoms and synthetic judgment of failure situations rely on professional manpower rather than computers.

When there is an abnormal signal on the industrial plan, experts check the P&ID one by one to find out a cause of the abnormal signal, but it is very difficult and it takes much time to observe ten thousands of operational signals, analyze connectivity among the signals, and find out the abnormal status and the device which causes the failure.

On the contrary, industrial plant systems using high pressure and temperature and high voltage have a high rate of failure, and when corrective measures are delayed, because they may cause fatal accidents, it require a great deal of sales loss and maintenance expenditures. Accordingly, the managers demand a systemizing technology of the monitoring system which can raise stability in operation of the plants by finding out the device which causes the failure, analyzing ripple effects, and rapidly taking proper corrective measures when there is an abnormal signal.

SUMMARY OF THE INVENTION

Accordingly, the present invention has been made to solve the above-mentioned problems occurring in the prior arts, and it is an object of the present invention to develop a solution to search out a device which causes a failure, analyze ripple effects of the system and display the analyzed results on a piping and instrument drawing (P&ID) when there is any abnormal signal in an industrial plant system, and to systemize related functions.

For this, the present invention provides a method of displaying an abnormal status in a plant operation monitoring system, which can monitor whether or not the plant system is in a normal operational state using sensors mounted on the industrial plant system and display a zone of an abnormal operational state on a piping and instrument drawing (P&ID) of the plant in various manners (difference in colors, thickness, and so on) when an operation value is out of a normal range, so that a manager can easily find out the abnormal zone of process.

Moreover, it is another object of the present invention to provide a method of grouping related parts using the P&ID on which the abnormal zone is indicated, tracing the abnormal signal in a reverse direction of a process flow in the relevant group and searching out the start point of the abnormal signal and a device which causes the failure, so that the manager can rapidly and exactly grasp the situation and take corrective measures to thereby prevent expansion of the failure when there is any failure in the complicated plant.

To achieve the above objects, the present invention provides a method of displaying an abnormal status in a plant operation monitoring system including the steps of: receiving information of operational states from sensing means mounted on devices, machines and facilities constituting an industrial plant system; checking whether or not there is any abnormal signal in the operational states, logically grouping parts influencing on operational values when the abnormal signal is generated, and displaying the parts on a piping & instrument drawing (P&ID) on a monitor; and tracing the abnormal signal in a reverse direction of a system flow, searching out the device which causes the abnormal state, and displaying the abnormal device on the piping & instrument drawing.

Moreover, the operational state information includes temperature information, pressure information, and flow rate information of the devices, machines and facilities of the industrial plant system.

Furthermore, one detection means is mounted in one group of the zones having the same operational state information.

Additionally, the step of grouping includes the step of linking the device causing the abnormal state in the plant system and the zones having the same operational state information and managing by a display unit.

In addition, the step of logically grouping the parts influencing on the operational values when the abnormal signal is generated and displaying them on the monitor includes the step of tracing the abnormal signal in a reverse direction of a system flow and detecting ripple effects by the abnormal signal.

Moreover, the step of searching out the device causing the abnormal state includes the step of first detecting the pre-stage facilities in the reverse direction to the system flow and tracing the device which causes the abnormal signal while continuously tracing in the reverse direction when the cause of the abnormal signal is not detected.

The method of displaying an abnormal status in the plant operation monitoring system according to the present invention can search out a device which causes a failure, analyze ripple effects of the system and display the analyzed results on a piping and instrument drawing (P&ID) when there is any abnormal signal in an industrial plant system, so that the displaying method allows a manager to easily grasp the operational state and raises a monitoring efficiency.

Accordingly, during the operation of the plant system including various systems by zones, machines, structures, and others, when there is any abnormal signal, the present invention can logically group the process systems, set analyzing zones, and display the start point of a cause of failure and ripple effects on the P&ID to thereby easily grasp the operational state of the plant system. Therefore, when there is any abnormal signal, the present invention can trace the abnormal signal in a reverse direction and in a forward direction of a system flow at the relevant position, search out the device which causes the failure, and rapidly grasp the ripple effects.

Finally, because the present invention rapidly and exactly check the abnormal zone and search out the device which causes the failure, the present invention can remove dead zones of monitoring, reduce inconvenience in management, prevent progress and expansion of the failure by sufficiently securing the period of time to take necessary measures through early detection of the failure.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 5 is a view showing a method of dividing the monitoring zone for monitoring causes of changes in cooling water temperature and pressure and ripple effects in order to group monitoring systems in the generator winding and cooling system;

DETAILED DESCRIPTION OF THE PREFERRED EMBODIMENT

Reference will be now made in detail to the preferred embodiment of the present invention with reference to the attached drawings.

Figure 1:
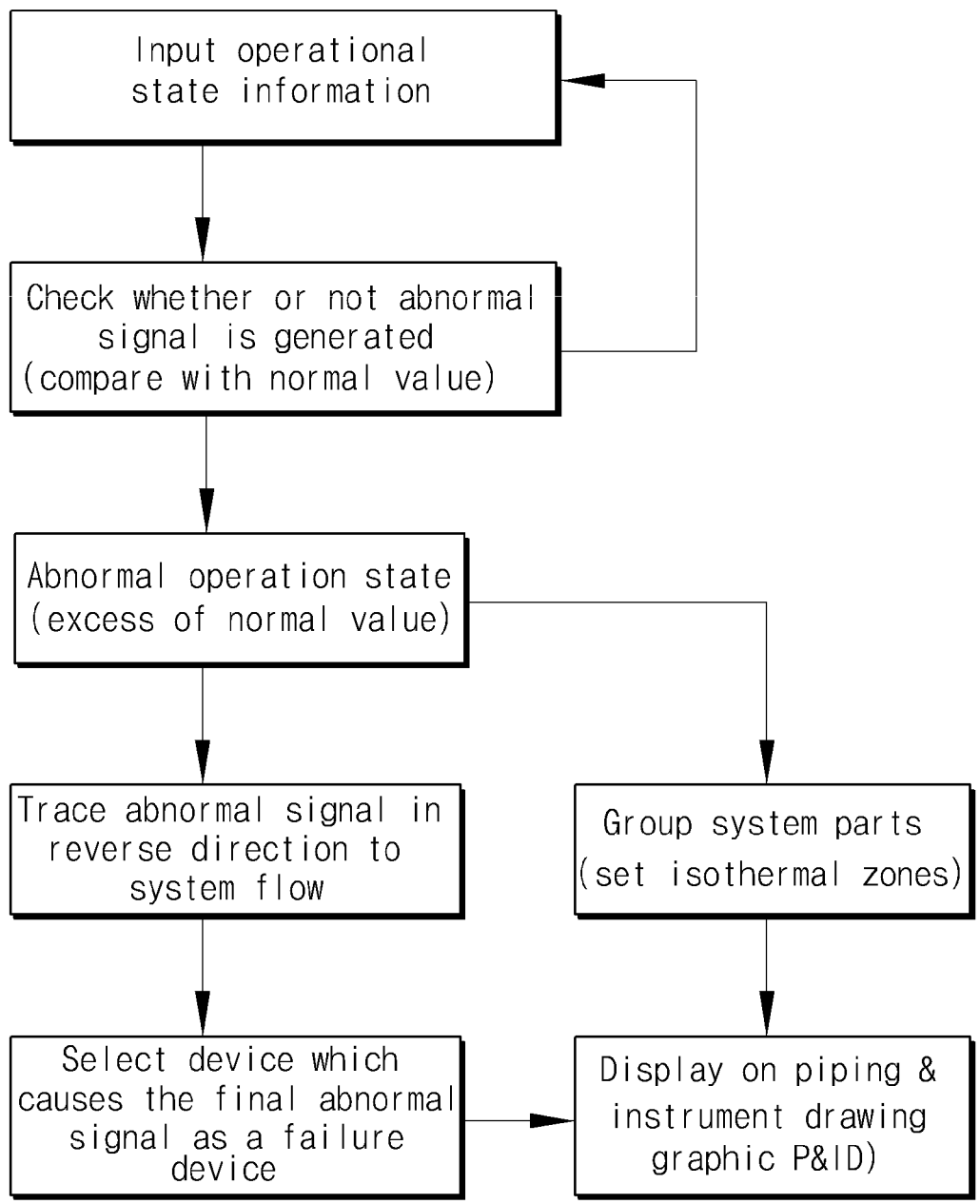
FIG. 1 is a flow chart showing procedures of a signal treatment and an output display.

A method of displaying an abnormal status in a plant operation monitoring system is carried out through a flow of the process illustrated in FIG. 1. The method of displaying the abnormal status in the plant operation monitoring system includes the steps of: receiving information of operational states from sensing means mounted on all parts, such as devices, machines and facilities constituting an industrial plant system; checking whether or not there is any abnormal signal in the operational states; logically grouping the system parts in which the abnormal signal is generated; displaying the abnormal signal in the grouped zone; tracing the abnormal signal in a reverse direction of a system flow and searching out a device which causes a failure; and displaying treatment results on a piping and instrument drawing (P&ID).

In the plant operation monitoring system according to the present invention, the system which receives the operational state is a previously installed system to monitor the operational state of the plan, but is not described in detail in this specification, and the abnormal signal means a signal which is out of a normal operation range and is not limited to specific means.

Figure 2:
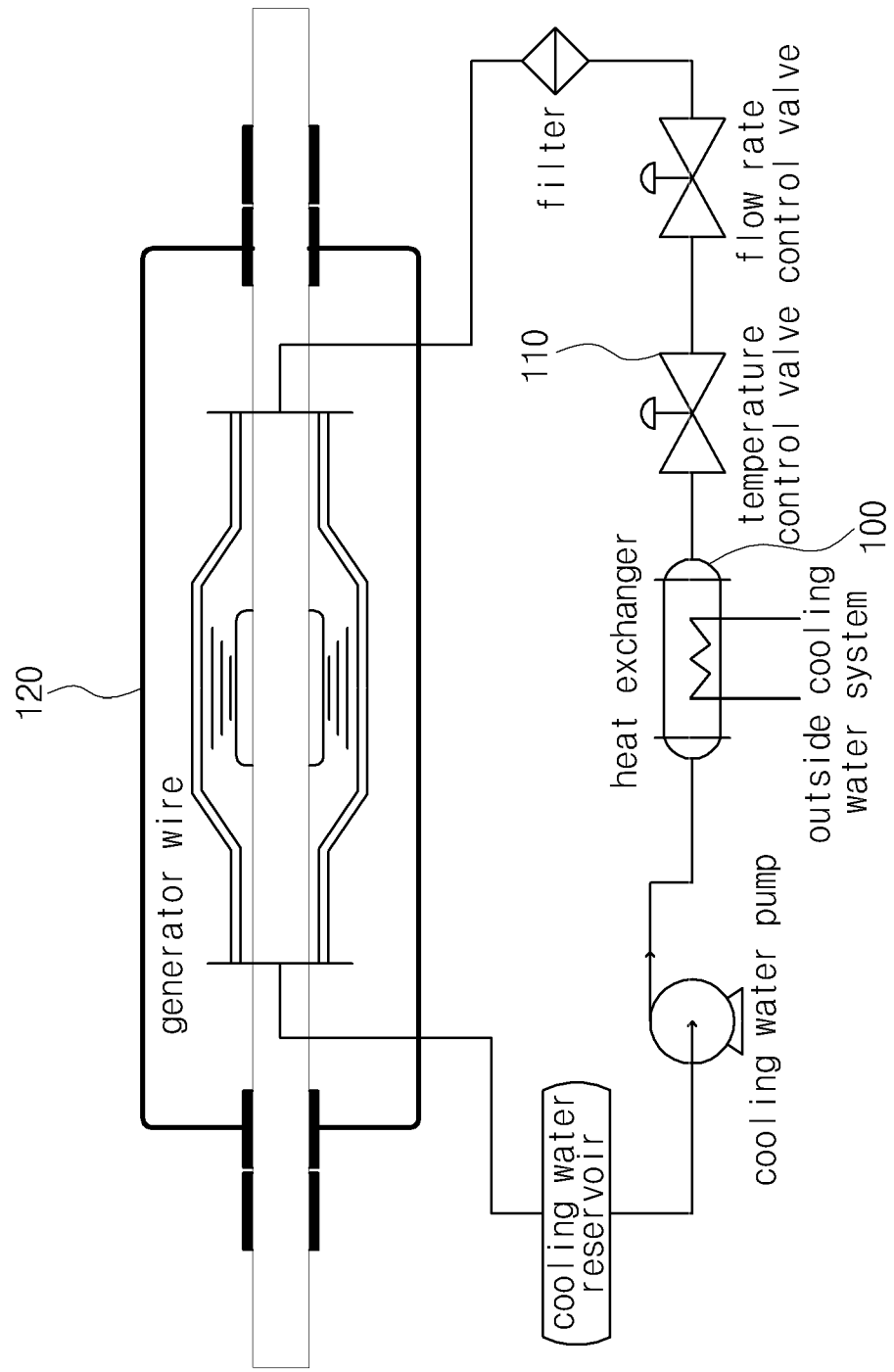
FIG. 2 is a distribution diagram of a generator winding and cooling system as an example of an industrial plant system.

FIG. 2 illustrates a piping and instrument drawing (P&ID) of a generator winding and cooling system. In the generator winding and cooling system, cooling water supplied from a cooling water pump is cooled through a heat exchanger 100, is controlled in temperature through a temperature control valve 110, and is supplied to a wire of the generator through a flow control valve and a filter. The cooling water which is increased in temperature while passing through the generator wire 120 circulates the above-mentioned process and keeps the cooling system in a stable condition.

Figure 3:
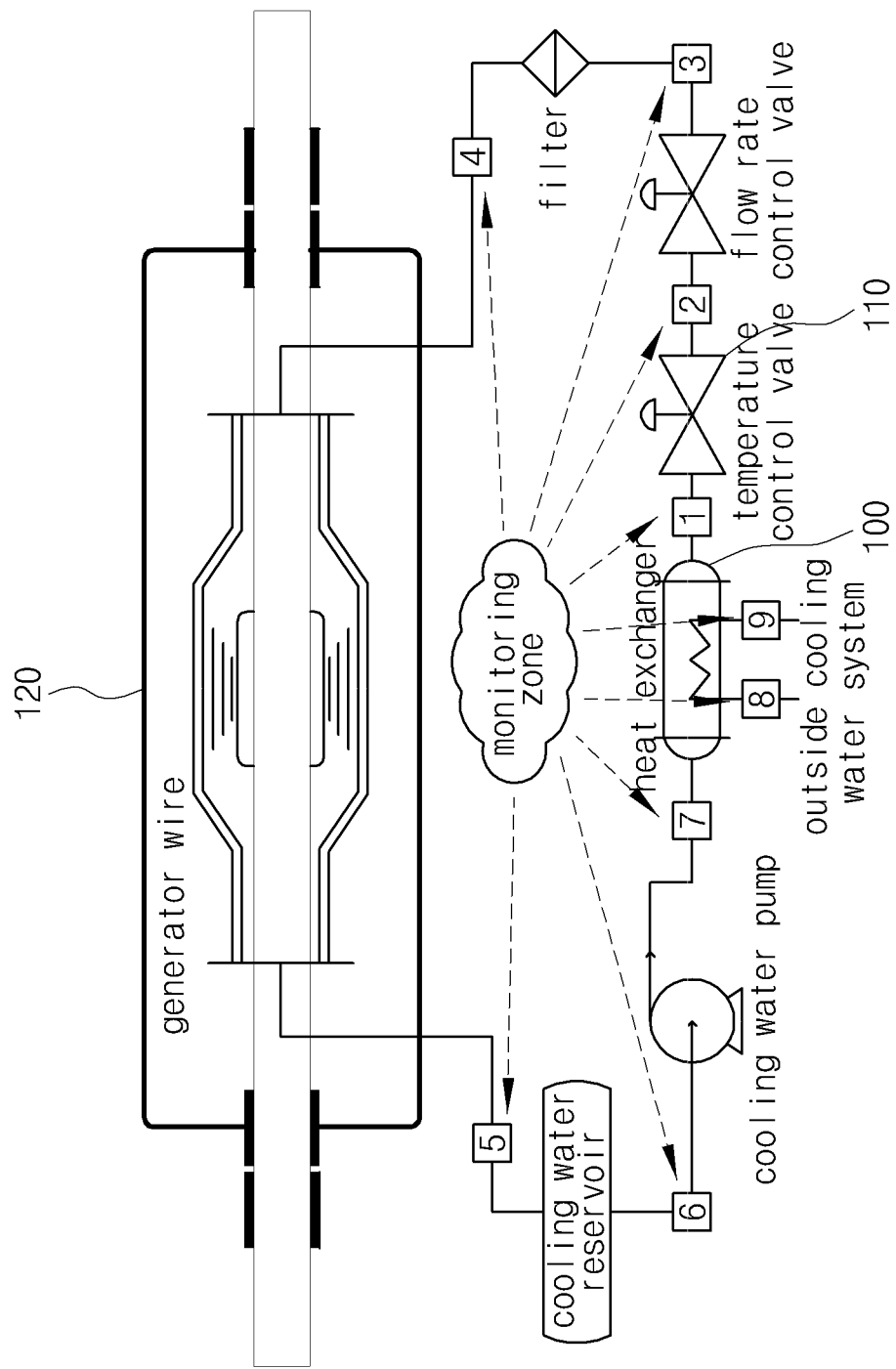
FIG. 3 is a view showing a division of a monitoring zone for monitoring an operational state of the generator winding and cooling system of FIG. 2.

When the generator winding and cooling system is physically divided, as shown in FIG. 3, it is divided into nine monitoring zones, and measuring sensors for measuring temperature, pressure, flow rate, and so on are mounted in each zone in order to monitor the operational state, and the sensors monitor whether or not there is any abnormal status.

In the case of most of the existing plants, persons judge operational states of the devices and machines using measuring instruments mounted in each zone. However, in the case that the operational states are remotely monitored by a computer, it is economical because just one measuring sensor is mounted to monitor signals because zones having physical identical process values (called as equal value zones: an isothermal zone; an isobaric zone; and so on), for instance, are regarded as one zone, and the abnormal status is also displayed in one zone.

For instance, in order to monitor temperature, devices or machines which may cause a change in temperature of the plant system must be found out of all of the devices and machines included in the plant system. In the case of the generator winding and cooling system illustrated in FIG. 4, the heat exchanger 100, the temperature control valve 110, the generator wire 120, and others may cause the change in temperature.

Figure 6:
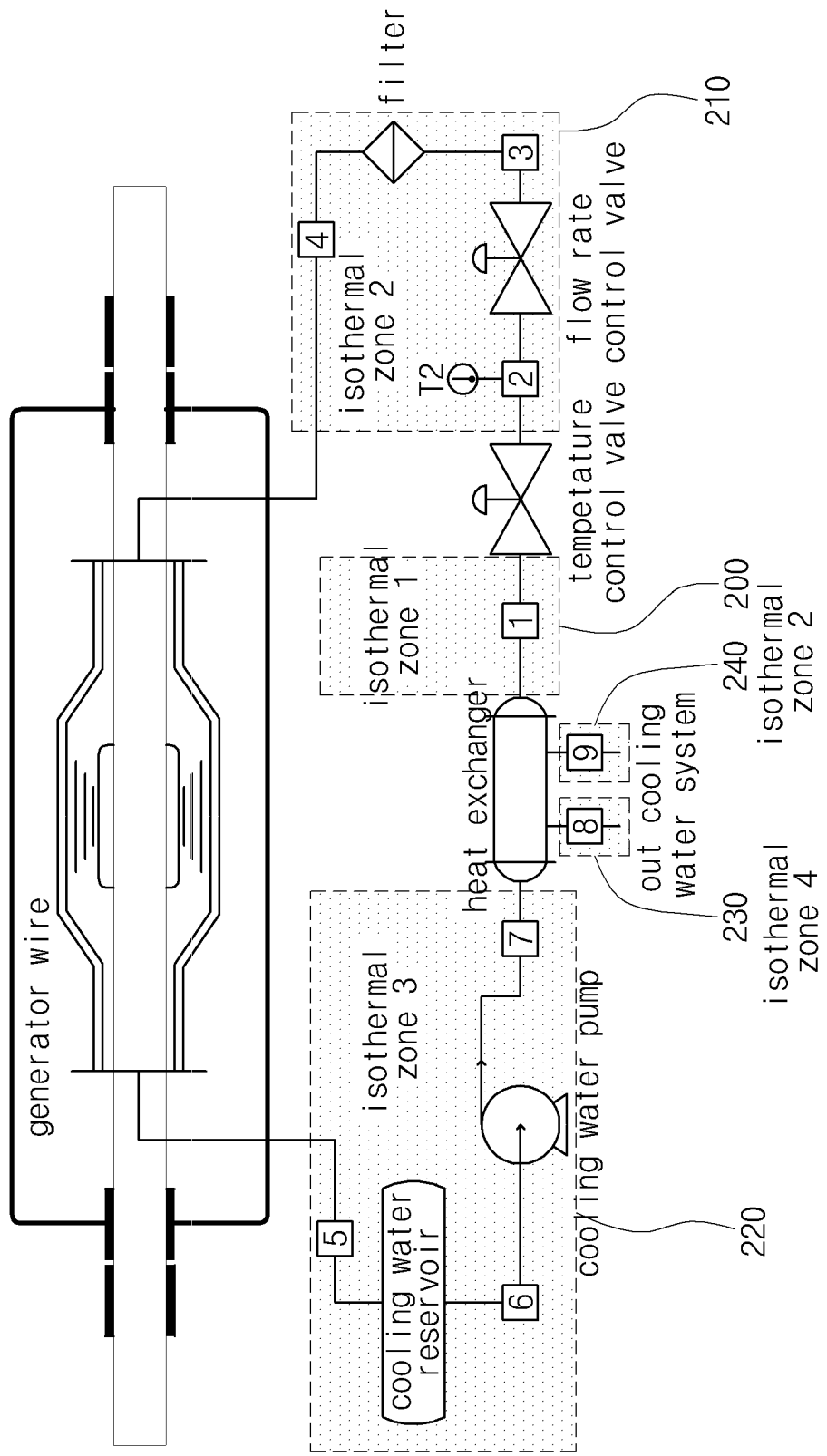
FIG. 6 is a view showing a piping and instrument drawing (P&ID) on which grouping results of an isothermal zone of the generator winding and cooling system of FIG. 5 are displayed.

Temperature influences of the devices and machines which cause the change in temperature of the plant system and a method of dividing the isothermal zone are illustrated in FIGS. 5 and 6. Referring to FIGS. 5 and 6, the temperature zone will be analyzed on the basis of the heat exchanger. An outlet pipe (monitoring zone ①) of the heat exchanger 100 which is the device causing the change in temperature becomes a first isothermal zone 200, and an area ranging from an outlet pipe (monitoring zone ②) of the temperature control valve which is the device causing the change in temperature to a monitoring zone ③ and a monitoring zone ④ passing through the flow rate control valves and the filters becomes a second isothermal zone 210.

The flow rate control valves or the filters mounted in the monitoring zones ②, ③ and ④ correspond one isothermal zone because they cannot cause the change in temperature.

The above method will be applied as follows. The next device which causes the change in temperature is the generator wire. The cooling water passing through the generator wire is introduced into the heat exchanger after passing through a cooling water reservoir and a cooling water pump, and in this instance, because there is no device causing the change in temperature in monitoring zones ⑤, ⑥ and ⑦, all of the monitoring zones ⑤, ⑥ and ⑦ become a third isothermal zone 220.

Fourth and fifth isothermal zones 230 and 240 are pipes to which outside cooling water for cooling the heat exchanger is supplied, and the pipes are connected to another cooling system.

Figure 7:
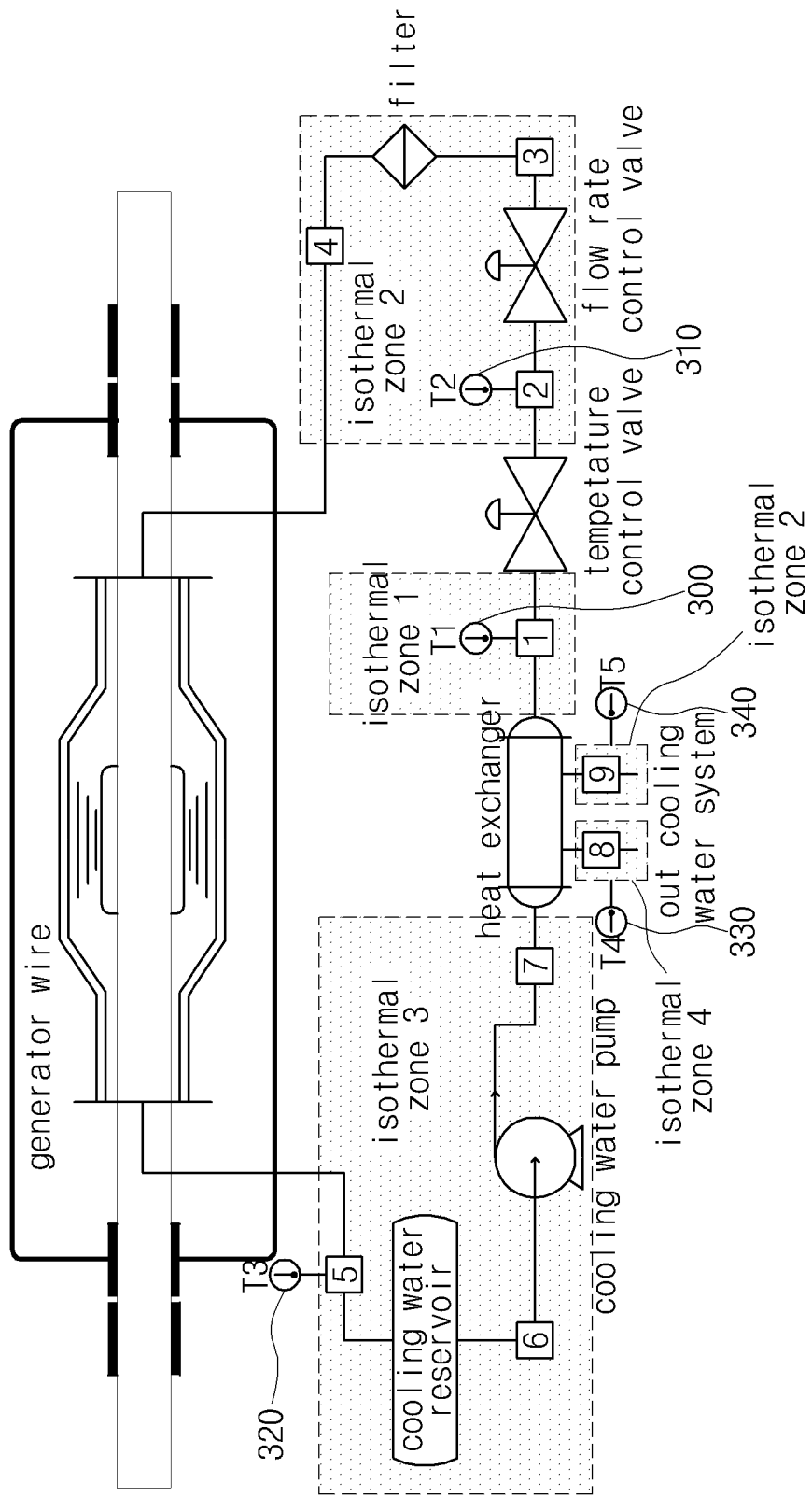
FIG. 7 is a view showing a temperature sensor mounted based on setting of the isothermal zone in the generator winding and cooling system of FIG. 6.

FIG. 7 illustrates a state where temperature sensors are mounted in the generator winding and cooling system of FIG. 6. Because only one temperature sensor is mounted in the isothermal zone, there are nine monitoring zones but there are five isothermal zones, and hence, the number of mounted temperature sensors (T1 to T5) 300 to 340 is decreased by 40 percent.

Figure 4:
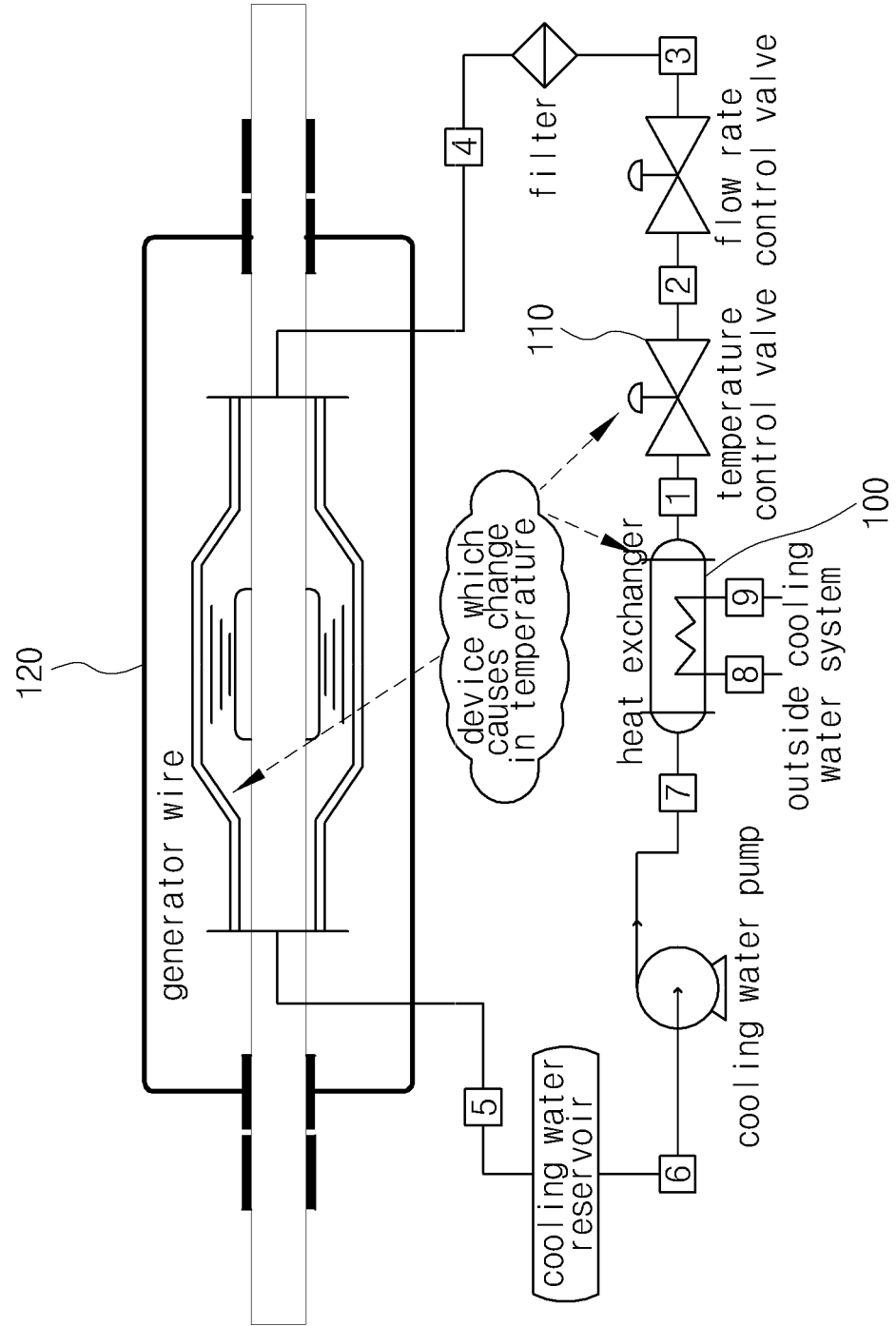
FIG. 4 is a view showing a device for changing cooling water temperature in the generator winding and cooling system of FIG. 2.

When the detection sensors are mounted in the isothermal zones divided through the processes illustrated in FIGS. 4, 5 and 6 in order to receive an abnormal signal, because only one detection sensor is mounted in the zones having the same operational state information, it is an effective design to reduce installation fees and it is an important factor to group the systems of the present invention.

In order to detect other operational state information, such as pressure information, flow rate information, or others, isobaric zones or uniform flow zones are set in consideration of devices which may cause changes in pressure or flow rate. In FIGS. 5 and 6, the devices which cause changes in pressure are the heat exchanger, the flow rate control valve, the filter, the wiring pipe, and the cooling water pump, and hence, the isobaric zone is divided into seven zones and the detection sensors are mounted in the seven zones one by one.

As described above, the method of mounting the detection sensors in consideration of the operational state conditions of the plant system, grouping the monitoring zones and treating and displaying the abnormal signal will be described in more detail as follows.

The system which received the operational state information checks whether or not the input signal is out of a normal range in real time, and when the abnormal signal is generated at any position, the abnormal signal is indicated in the monitoring zone on the piping and instrument drawing (P&ID). In this instance, referring to the isothermal zones previously set, the abnormal state is indicated in all relevant monitoring zones.

For instance, if temperature of T1 300 is increased due to a failure of the heat exchanger but temperature of T2 310 is in a normal condition due to the operation of the temperature control valve, the system checks an isothermal zone table so as to find out that T1 belongs to the first isothermal zone (including the monitoring zone ①), and indicates the abnormal state of the monitoring zone ①.

Next, the system progresses to the step of searching out the device which causes the abnormal state. Because the device which causes the change in temperature in the first isothermal zone is the heat exchanger, it is assumed that the device which first causes the abnormal state is the heat exchanger, and in order to trace another device which causes the abnormal state, the system traces the abnormal signal in the reverse direction of the system flow.

Because there is no abnormal signal as a result to check the temperature of the outlet T3 320 of the generator wire and the temperature of the inlet T4 330 of the outside cooling water, which are the advance stage of the heat exchanger, it is decided that the device which causes the abnormal state is the heat exchanger and it is indicated on the piping and instrument drawing (P&ID).

Therefore, on the piping and instrument drawing (P&ID), it is indicated that the heat exchanger is the device causing the abnormal state and the ripple effects are indicated in the first isothermal zone (monitoring zone ①). The device causing the abnormal state may be displayed on the piping and instrument drawing (P&ID) in different color using a graphic function or displayed in flickering or in different forms of the system lines (thickness, dotted line, or others).

As another example, when the temperature control valve is in failure, the temperature of an outlet T2 of the temperature control valve and the temperature of an outlet T3 320 of the generator wire are increased and an abnormal signal is generated, and in this instance, the system checks that T2 310 belongs to the second isothermal zone 210 and T3 belongs to the third isothermal zone from the isothermal zone table. Accordingly, the system displays that the abnormal state is generated in the second isothermal zone (monitoring zones ②, ③ and ④) and the third isothermal zone (monitoring zones ⑤, ⑥ and ⑦) on the piping and instrument drawing.

After that, the system progresses to the step of searching out the device which is in failure. Because the device which causes the change in temperature in the third isothermal zone is the generator wire, it is assumed that the device which first causes the abnormal state is the generator wire, and in order to trace another device which is in failure, the system traces the abnormal signal in the reverse direction of the system flow.

Because the abnormal signal is generated due to an increase of temperature in the second isothermal zone 210, the system assumes that the temperature control valve which causes the change in temperature of T2 is the device which is in failure, and in order to search out another device which is in failure, the system checks a change in temperature of the first isothermal zone. But, because there is no abnormal signal in the first isothermal zone, the system decides the temperature control valve is the device which is in failure and displays it on the piping & instrument drawing.

Figure 8:
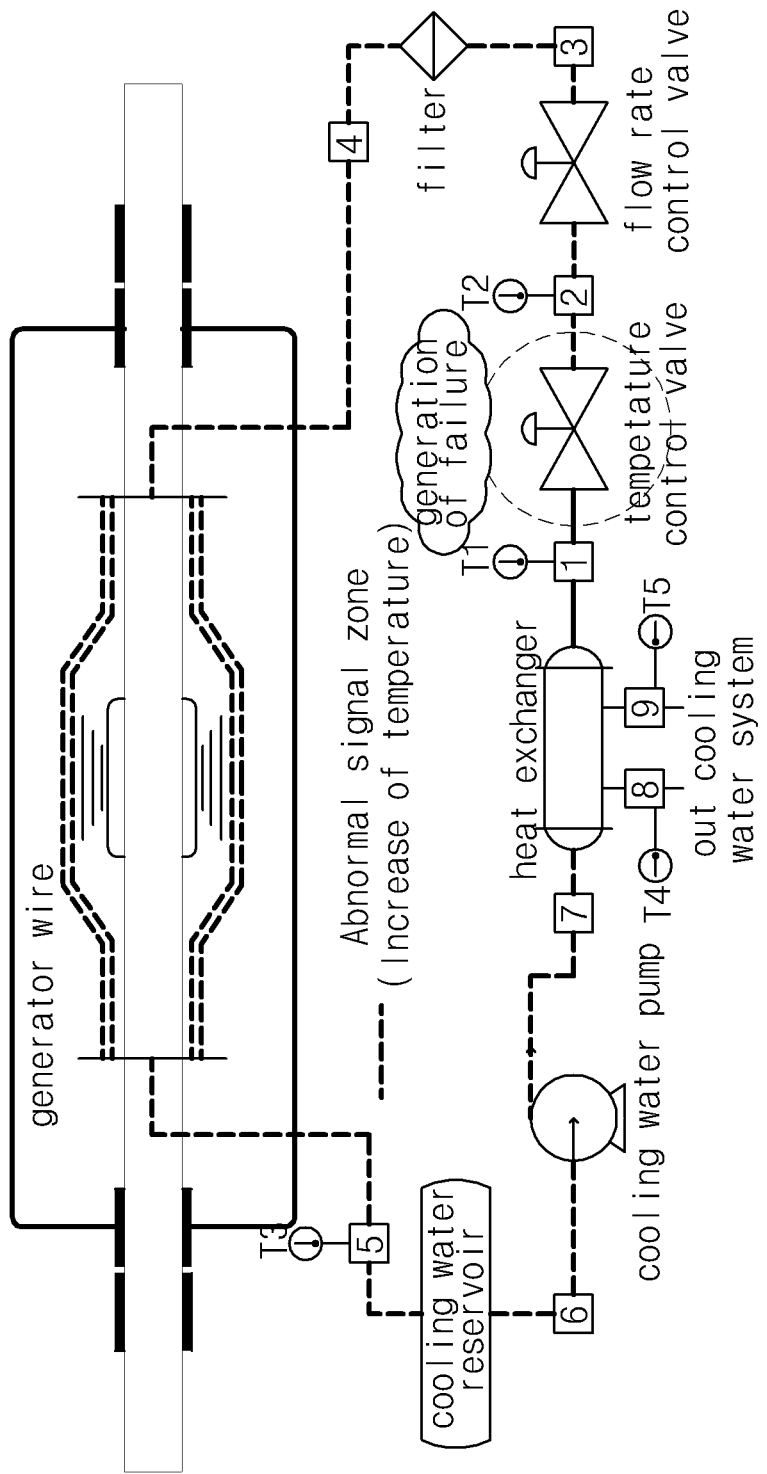
FIG. 8 is a view showing the piping and instrument drawing (graphic P&ID) on which a device that causes a failure and system ripple effects are displayed.
Figure 9:
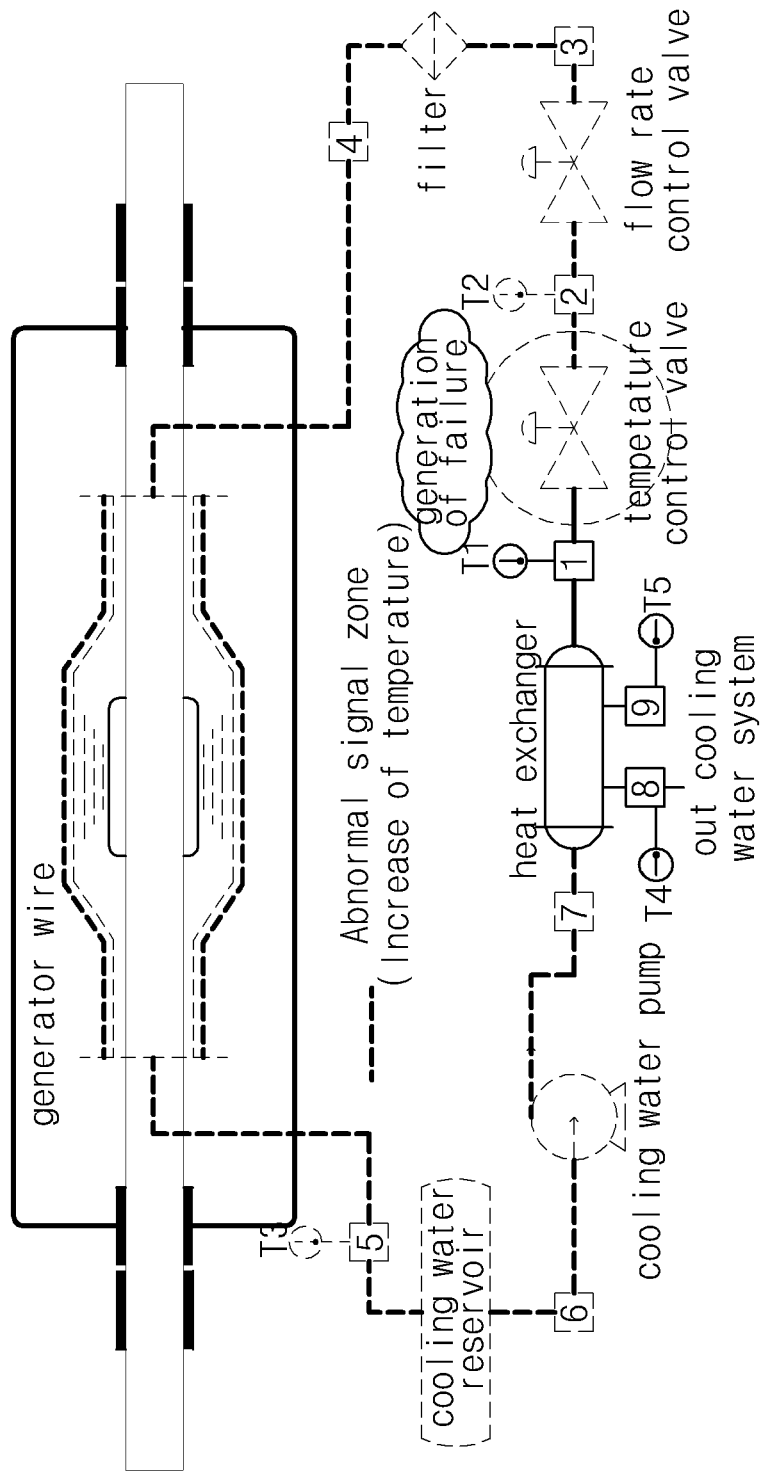
FIGS. 9 and 10 is a view showing another example of the display of the piping and instrument drawing (P&ID) of FIG. 8.
Figure 10:
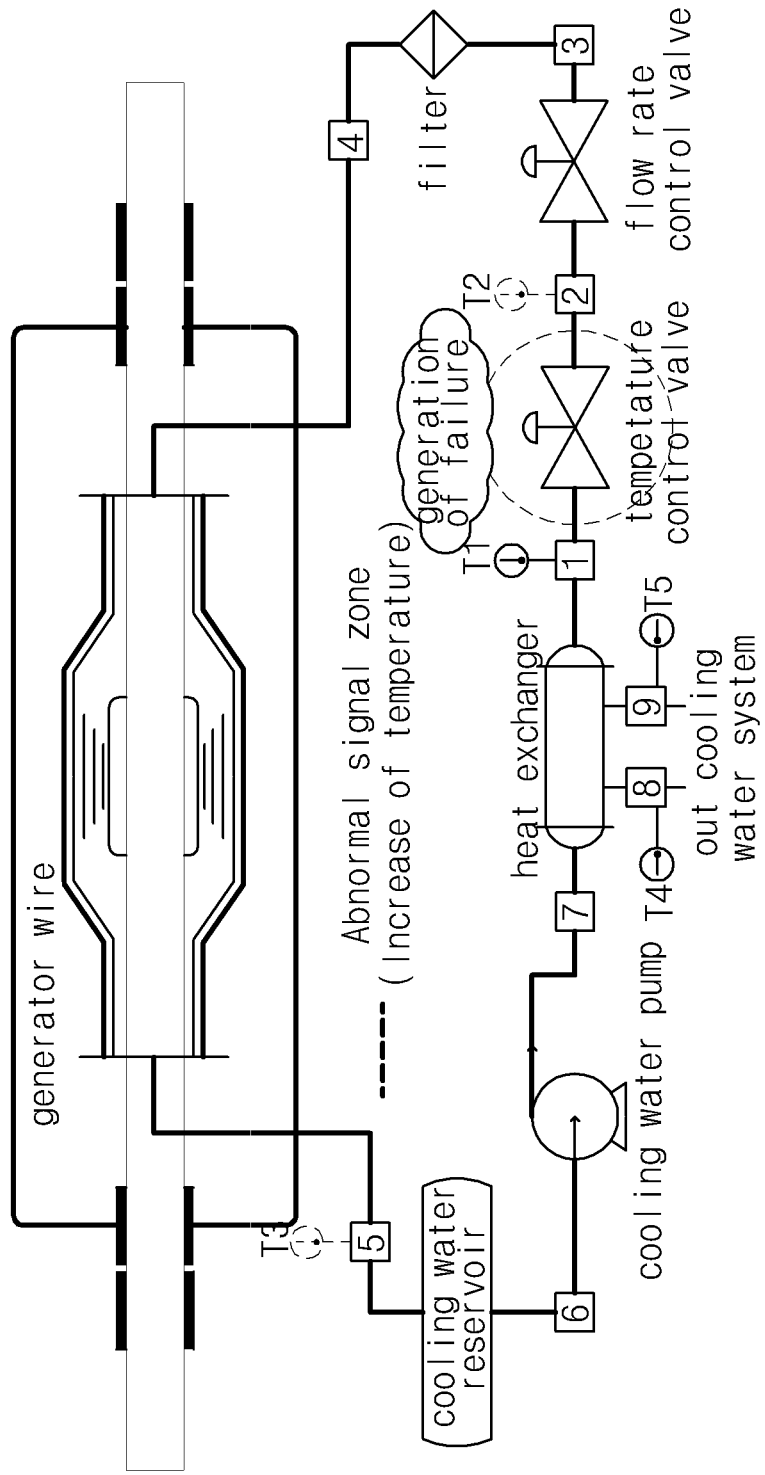

Accordingly, on the piping & instrument drawing, it is indicated that the temperature control valve is the device which is in failure, and the ripple effects are indicated in the second isothermal zone (monitoring zones ②, ③ and ④) and the third isothermal zone (monitoring zones ⑤, ⑥ and ⑦). The device causing the abnormal state may be displayed on the piping and instrument drawing (P&ID) in different color using a graphic function or displayed in flickering or in different forms of the system lines (thickness, dotted line, or others). FIG. 8 is a view showing the piping and instrument drawing (graphic P&ID) on which a device that causes a failure and system ripple effects are displayed, and FIGS. 9 and 10 is a view showing another example of the display of the piping and instrument drawing (P&ID) of FIG. 8. As shown in the drawings, the devices and system lines may be displayed on the piping and instrument drawing in various ways, for instance, the system lines are indicated by dotted lines, or all of the devices, temperature sensors and system lines are indicated by dotted lines, or only the temperature sensors are indicated by dotted lines.

FIG. 5 is a schematic diagram showing a state where the systems of the plant system are grouped by temperature signal and a state where the systems of the plant system are grouped by pressure signal, and also in the group of the isobaric zones, the method of treating the abnormal signal and searching out the device which is in failure is the same as the above method.

The displaying method according to the present invention displays the abnormal state through grouping of the plant systems which are in logical correlation so that managers can easily analyze the cause of the failure, and hence, allows the managers to rapidly and exactly take measures through plant operation monitoring, analysis of failure cause, analysis of ripple effects, and so on.

As described above, while the present invention has been particularly shown and described with reference to the example embodiments thereof, it will be understood by those of ordinary skill in the art that various changes in form and details may be made therein without changing the technical idea or essential characteristics of the present invention as defined by the following claims. Therefore, it would be understood that the above embodiments of the present invention are all exemplified and the present invention is not restricted to the above embodiments. Accordingly, it should be understood that there is no intent to limit example embodiments of the invention to the particular forms disclosed, but on the contrary, example embodiments of the invention are to cover all modifications, equivalents, and alternatives falling within the scope of the invention without departing from the spirit and scope of the present invention as defined by the following claims.

What is claimed is:

1. A method for displaying an abnormal signal for industrial plant equipment monitoring comprising the steps of:
   receiving operation status information from a sensor mounted on industrial plant equipment comprised of devices, machines, and facilities;
   checking the abnormal signal in the operation status information;
   when the abnormal signal is generated, grouping variation causing factors corresponding to the devices that influence generation of the abnormal signal among the devices, machines and facilities;
   displaying a piping & instrument drawing (P&ID) by the grouped variation causing factors on a monitor for equipment monitoring; and
   tracing the abnormal signal in a reverse direction of an operation system flow to detect a device generating the abnormal signal, finding a variation causing constitution of the abnormal signal and displaying the device generating the abnormal signal on the piping & instrument drawing (P&ID),
   wherein in the step of displaying the piping & instrument drawing (P&ID), constitutions disposed in zones having the same operation status information are connected and grouped to make a group with respect to isothermal or uniform pressure zones having the same operation status information corresponding to a circulation zone of a system flow of the industrial plant equipment, and when the operation status information is changed in the group, the variation causing constitution included in the group is detected as a disorder causing device, and the sensor is mounted on one group having the same operation status information to detect the operation status information of the constitutions because the constitutions in one group have the same operation status information,
   wherein in the step of displaying the abnormal device, the grouped constitutions are outputted in different colors to be distinguished on the monitor to enable a manager to discern.

2. The method of claim 1, wherein the operation status information includes temperature information, pressure information and flow information of the devices, machines and facilities constituting the industrial plant equipment.

3. The method of claim 1, wherein the abnormal signal includes the operation status information of the industrial plant equipment being out of a regular and normal operation range.

* * * * *